L. NICOLETTI.
CIPHER APPARATUS.
APPLICATION FILED DEC. 7, 1918.

1,311,457.

Patented July 29, 1919.
2 SHEETS—SHEET 1.

Inventor:
Luigi Nicoletti
By ... 
Attorney.

L. NICOLETTI.
CIPHER APPARATUS.
APPLICATION FILED DEC. 7, 1918.
1,311,457.
Patented July 29, 1919.
2 SHEETS—SHEET 2.
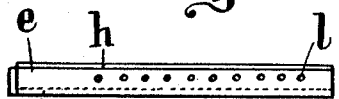
Inventor:
Luigi Nicoletti

UNITED STATES PATENT OFFICE.

LUIGI NICOLETTI, OF ROME, ITALY.

CIPHER APPARATUS.

1,311,457.  Specification of Letters Patent.  Patented July 29, 1919.

Application filed December 7, 1918. Serial No. 265,776.

*To all whom it may concern:*

Be it known that I, LUIGI NICOLETTI, subject of the King of Italy, residing at Rome, Italy, have invented certain new and useful Improvements in Cipher Apparatus, of which the following is a specification.

This invention has for its object an apparatus by means of which it is possible to cipher and decipher messages and writings of any kind and in any language by multiple transposition of each letter and by using a number as key.

The apparatus according to this invention, comprises essentially a set of bars mounted parallel with each other and adapted to slide into a frame having two stationary reference members or parts. On each sliding bar figures are marked, the same being arranged in any desired succession and being spaced apart from each other to equal spaces, so that by carrying said bars in a given position corresponding with the key number adopted, a table is obtained on the apparatus the same providing rules for dividing into various assemblage the letters forming the message or writing to be ciphered, the letters being assumed to be written after each other without leaving a free space between subsequent words; said letters may thus be assembled in several manners, to form the cipher message, according to any desired rule, but in any case the letters are in a given relation with the desired key number or, if required, with other rules stated by the correspondents.

The annexed drawing shows by way of example some constructions of apparatus according to the invention, and Figure 1 shows a construction of the apparatus in its closed position, Fig. 2 is a view of the same during use;

Fig. 3 shows another construction of the apparatus in closed position,

Fig. 4 is a cross-section of the apparatus shown in Fig. 3;

Fig. 5 is a bottom view of a detached sliding bar;

Fig. 6 shows the apparatus represented in Fig. 3 in use, and

Fig. 7 is a face view of a card which may be used in connection with the apparatus shown in Fig. 3.

Figure 1:
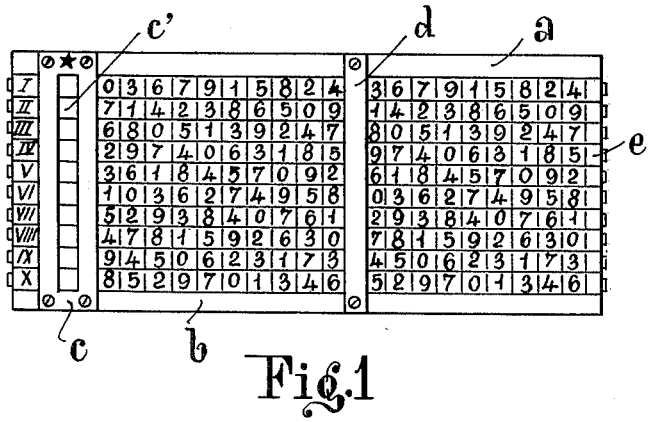
Figure 2:
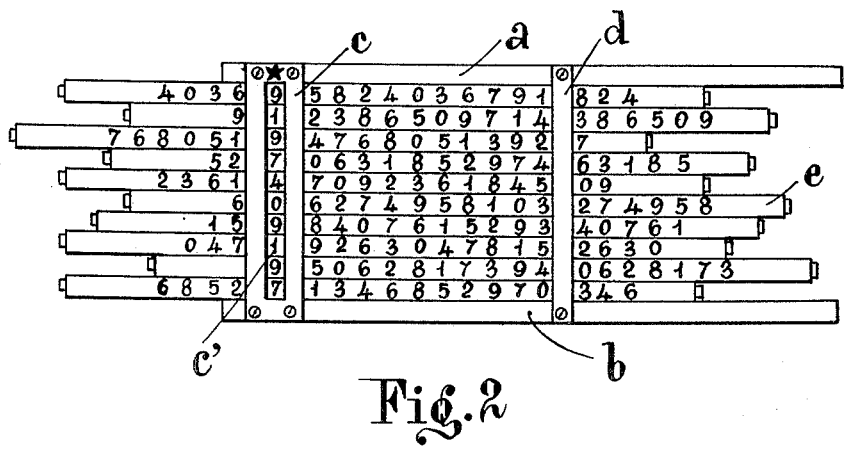

In the construction shown in Figs. 1 and 2, the apparatus comprises a frame made of two side members $a$ and $b$ connected by means of two transverse members $c$ and $d$, ten bars $e$ being mounted to slide longitudinally or endwise between said members. On each of said bars are marked figures from 0 to 9, the same being located at the side of each other and being repeated in the same succession on each respective bar, the succession of the figures being any required one and, if desired, different in the individual bars, as shown in Fig. 1. Each of said bars $e$ may be provided with a particular reference or character, say in roman numerals, located preferably at one of its ends, the same being intended to differentiate each bar from the other ones; further each bar is provided, also near one end, with a clear or unmarked space the same being positioned under the transverse member $c$ when the apparatus is in closed position, said transverse member being taken as reference part.

The transverse member $c$ is preferably provided with a vertical opening $c'$ to safely individuate the figure of each bar which is carried in register with the reference part when using the apparatus.

By moving the several bars $e$ it is always possible to carry any required figure thereof in register with opening $c'$ and the apparatus will be ready for use when into said opening appear the figures forming the number adopted as key.

In the above described apparatus the key may have up to ten figures, but it may comprise a smaller number of figures; in this case, if required, the correspondents may take as a rule that the figures of the key number must be assumed to be repeated in the same succession.

Thus, by way of example, in Fig. 2 the apparatus is shown in its position for the key 919740.

Between transverse members *c* and *d* are thus arranged ten vertical rows and ten horizontal rows of figures, the same giving rise to a ciphering table that is a table which may be used in accordance with any desired rule stated by the correspondents to properly assemble the letters forming the words of the writing to be ciphered into groups each formed by the number of letters given by the subsequent figures of the table; for this operation said words are to be written in close succession after each other, that is without leaving a free space between two subsequent words. Thus by assuming by way of example that it has been agreed upon to read said figures in vertical rows from top to bottom and from left hand to right hand, the cipher (0) being omitted, the subsequent figures of the table as appearing from Fig. 2, in accordance with the key assumed, are: 5 2 4 7 6 8 9 5 1 8 3 7 6 2 4 2 3 2 8 6 . . ., and by assuming that the following sentence has to be ciphered: " Kindly reach me immediately I will await you at the stated place on twenty first instant at six o'clock," the words of this sentence will be assembled in the following groups:

Kindl yr each meimmed iately iwillawa ityouatth estat e dplaceon twe ntyfirs tinsta nt atsi xo 'cl oc k.

Obviously the last letter group may comprise a smaller number of letters with regard to that shown by the last figure. Should the message continue after all the table figures have been used the same table is used again from beginning to the required number of times.

The several groups of letters thus obtained are then written in rows on a paper sheet provided with cases, these rows being marked by figures 1 to 9 arranged, by way of example, in the same succession as these figures are located into one of the horizontal or vertical rows of the table, the same horizontal or vertical row being known as a rule by the correspondents.

By assuming that the arrangement of the sixth horizontal row must be adopted because the key assumed contains six figures, the following arrangement will be formed:

| 6 | 2 | 7 | 4 | 9 | 5 | 8 | 1 | 3 |
|---|---|---|---|---|---|---|---|---|
| k | i | n | d | l |   |   |   |   |
| y | r |   |   |   |   |   |   |   |
| e | a | c | h |   |   |   |   |   |
| m | e | i | m | m | e | d |   |   |
| i | a | t | e | l | y |   |   |   |
| i | w | i | l | l | a | w | a |   |
| i | t | y | o | u | a | t | t | h |
| e | s | t | a | t |   |   |   |   |
| e |   |   |   |   |   |   |   |   |
| d | p | l | a | c | e | o | n |   |
| t | w | e |   |   |   |   |   |   |
| n | t | y | f | i | r | s |   |   |
| t | i | n | s | t | a |   |   |   |
| n | t |   |   |   |   |   |   |   |
| a | t | s | i |   |   |   |   |   |
| x | o |   |   |   |   |   |   |   |
| , | c | l |   |   |   |   |   |   |
| o | c |   |   |   |   |   |   |   |
| k |   |   |   |   |   |   |   |   |

By writing in succession by way of example from top to bottom the letters located in the vertical rows marked by figures 1, 2, 3, 4, 5 . . . the following is obtained:

atniraeawtspwtittocchdhmeloaafsieyaaera kyemiiieedtntnax'okncitiytleynsldwtoslmllu tcit.

The letters may be arranged to form assemblages for instance of five each in order to facilitate the transmission by cable and the verification.

The correspondent who is provided with the same apparatus and knows the key as well as other rules above referred to, may translate into usual language the message by following the same method, but in the reverse succession, that is by writing the letters in rows from top to bottom, on a paper sheet provided with cases, without going beyond a lower limit determined by agreement.

In the construction illustrated in Figs. 3 and 6, the apparatus comprises twenty sliding bars $e$, each of them being provided with ten figures (1, 2, 3, 4 . . . 0) arranged in their natural succession from left to right hand.

In such a case, by bringing a given figure of one of said sliding bars $e$ into the opening $c'$ of the transverse member $c$, a number of spaces is left free between the right end of the same bar and the opposite transverse member $d$ of the frame, such number being equal to the units of said figure.

Thus, after the bars have been moved to carry in register with opening $c'$ the respective figure of each bar to form the key number, instead of obtaining on the apparatus a table showing the number of letters having to be written into a horizontal row of a paper sheet, as in the above described example, the apparatus provides directly rows of free cases each row having a different number of cases into which the letters of the message may be written.

In this construction the key may comprise up to twenty figures. As it appears from Fig. 6, on the apparatus a number of cases is left free into which cases are then written in succession the letters of the message, thereby being obtained their arrangement by horizontal and vertical rows; thereafter said letters are written by vertical rows taken in the succession shown by figures on the frame member $a$, as in the example above referred to, and the ciphering is obtained.

In order to allow of writing the letters on the same apparatus also in the case of a somewhat long message, it is useful to provide behind the bars $e$ a space $f$ into which cards $g$ or the like may be inserted one after another the cards being provided with horizontally numbered rows of cases (Fig. 7); the letters are written in the respective cases which are cleared by bars $e$ after the same have been carried into their respective key positions and the cipher sentence is then obtained by copying from the said cards the letters by vertical row succession as shown by figures marked on the top of said cards.

The bars $e$ are preferably interengaged with each other by means of tongues or lips $h$ and slots $i$ provided on the sides thereof, so as to hold them in the same plane; the under surfaces of said bars are conveniently provided with recesses $l$ in register with each figure marked on the front or top surfaces, said recesses being intended to engage a projection $m$ provided on the frame member $c$ (see Figs. 4 and 5) for the purpose of locking said plates with their figures arranged exactly in vertical rows.

Obviously the number of bars and of figures marked on each of them may be modified according to requirements; also the construction of the apparatus may differ from that described and illustrated, the same being given merely by way of example.

In any case the described apparatus allows of quickly and easily ciphering sentences and messages by multiple transposition of letters, the language being immaterial as the transposition is made upon rules based upon the arithmetic value of the figures.

Further this apparatus provides the advantage of allowing the use as key of a number which may be kept in mind without requiring the use of formulæ or of noting by writing said key, this latter method being liable to cause the same key or formula to be detected.

The key may also be varied or modified at will and cannot be detected by inspecting the apparatus when the bars have been restored to their closed position.

The apparatus according to this invention may have very small size and allows quick and easy manipulations while providing a very large number of combinations, say about ten milliards, so that it is practically impossible to detect the key.

What I claim as my invention and desire to secure by United States Letters Patent is:

1. Ciphering apparatus comprising, in combination, a frame having fixed reference means thereon; and a plurality of parallel bars slidably mounted in the frame for displacement individually with relation to said reference means, all of the different bars bearing an equal number of figures so as to furnish for each position of the bars determined in accordance with a selected numerical key a ciphering table which forms a guide for the breaking up of the message into definite groups of letters.

2. Ciphering apparatus comprising, in combination, a frame having fixed reference means thereon; and a plurality of parallel bars slidably mounted in the frame for displacement individually with relation to said reference means, all of the different bars bearing an equal number of figures in regular numerical order, so as to furnish for each position of the bars determined in accordance with a selected numerical key a ciphering table constituted by the rows of letter-receiving cases left free by the movement of the bars and which determine the grouping of the letters of the message.

3. Ciphering apparatus comprising, in combination, a frame having fixed reference means thereon; a plurality of parallel bars slidably mounted in the frame for displacement individually with relation to said reference means, all of the different bars bearing an equal number of figures in regular numerical order, so as to furnish for each position of the bars determined in accordance with a selected numerical key a ciphering table constituted by the rows of letter-receiving cases left free by the movement of the bars and which determine the grouping of the letters of the message; and cards on which the letters of the message are to be grouped, said cards adapted to be inserted in the frame behind the bars.

4. Ciphering apparatus comprising, in combination, a frame having fixed reference means thereon; a plurality of parallel bars slidably mounted in the frame for displacement individually with relation to said reference means, said bars being engaged with one another and with the frame and all of them bearing an equal number of figures in regular numerical order, so as to furnish for each position of the bars determined in accordance with a selected key a ciphering table constituted by the rows of letter-receiving cases left free by the movement of the bars and which determine the grouping of the letters of the message; and cards on which the letters of the message are to be grouped, said cards adapted to be inserted in the frame behind the bars.

In testimony whereof I affix my signature.

LUIGI NICOLETTI.

Witnesses:
RELSOGI SCOTTI,
EDUARDO NILESE.